(12) United States Patent
Woo

(10) Patent No.: US 9,735,658 B2
(45) Date of Patent: Aug. 15, 2017

(54) MOTOR WITH MULTIPLE-POLE SENSING PLATE

(71) Applicant: LG INNOTEK CO., LTD., Seoul (KR)

(72) Inventor: Shung Hun Woo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 268 days.

(21) Appl. No.: 14/106,182

(22) Filed: Dec. 13, 2013

(65) Prior Publication Data

US 2014/0167572 A1    Jun. 19, 2014

(30) Foreign Application Priority Data

Dec. 14, 2012    (KR) .................. 10-2012-0146496

(51) Int. Cl.
*H02K 11/00*    (2016.01)
*H02K 11/215*    (2016.01)
*H02K 11/20*    (2016.01)
*H02K 11/21*    (2016.01)

(52) U.S. Cl.
CPC ....... *H02K 11/0021* (2013.01); *H02K 11/215* (2016.01); *H02K 11/20* (2016.01); *H02K 11/21* (2016.01)

(58) Field of Classification Search
CPC .......... H02K 11/0015; H02K 11/0021; H02K 11/27; H02K 11/215; H02K 11/21; H02K 11/20; H02K 11/001
USPC ......... 310/68 B, 68 E, 68 R, 156.06, 156.05, 310/156.12, 156.32, 156.43, 156.44, 310/156.38, 156.53, 156.56, 156.68; 335/296; 324/207.2, 207.25, 251, 117 H
See application file for complete search history.

(56) References Cited

U.S. PATENT DOCUMENTS

| 3,867,656 | A | * | 2/1975 | Mitsui | .................... | H02K 29/08 |
| | | | | | | 310/156.35 |
| 4,322,666 | A | * | 3/1982 | Muller | ................... | H02K 29/08 |
| | | | | | | 310/268 |
| 4,701,650 | A | * | 10/1987 | Maemine | ................ | G01P 3/487 |
| | | | | | | 310/171 |
| 5,637,945 | A | * | 6/1997 | Yamamuro | .............. | H02K 1/12 |
| | | | | | | 310/156.05 |

(Continued)

FOREIGN PATENT DOCUMENTS

CN    1222095 C    10/2005
CN    101257235 A    9/2008

(Continued)

OTHER PUBLICATIONS

EIC 2800 Search Report by Benjamin Martin Date May 16, 2016.*

(Continued)

*Primary Examiner* — Michael Andrews
*Assistant Examiner* — Maged Almawri
(74) *Attorney, Agent, or Firm* — Saliwanchik, Lloyd & Eisenschenk

(57) ABSTRACT

Provided are a motor and a sensing magnet of the motor. The sensing magnet includes a through hole that is positioned at a center portion thereof, and a plurality of poles which are formed along an outer periphery thereof. Here, the plurality of poles includes a first pole and a second pole extending from the first pole in a direction of the through hole.

1 Claim, 3 Drawing Sheets

(56) References Cited

U.S. PATENT DOCUMENTS

| | | | | |
|---|---|---|---|---|
| 5,654,600 | A * | 8/1997 | Nomura | H02K 11/215 |
| | | | | 310/156.05 |
| 5,717,268 | A * | 2/1998 | Carrier | G01P 3/487 |
| | | | | 310/156.06 |
| 5,796,195 | A * | 8/1998 | Miyakawa | B60K 6/26 |
| | | | | 310/216.009 |
| 6,013,961 | A * | 1/2000 | Sakamaki | H02K 29/08 |
| | | | | 310/177 |
| 6,242,826 | B1 * | 6/2001 | Saito | F16F 15/363 |
| | | | | 310/267 |
| 6,476,528 | B2 * | 11/2002 | Sekine | H02K 1/2786 |
| | | | | 310/156.05 |
| 6,680,553 | B1 * | 1/2004 | Takano | H02K 3/50 |
| | | | | 310/156.05 |
| 6,954,014 | B2 * | 10/2005 | Ohiwa | G01P 3/487 |
| | | | | 310/155 |
| 7,075,290 | B2 * | 7/2006 | Collier-Hallman | G01P 3/489 |
| | | | | 310/68 B |
| 7,518,273 | B2 * | 4/2009 | Kataoka | H02K 29/08 |
| | | | | 310/68 B |
| 7,686,516 | B2 * | 3/2010 | Shibasaki | F16C 19/522 |
| | | | | 324/207.25 |
| 8,816,677 | B2 * | 8/2014 | LaCroix | G01D 5/145 |
| | | | | 324/207.24 |
| 2002/0118011 | A1 * | 8/2002 | Wolf | G01B 7/003 |
| | | | | 324/207.2 |
| 2005/0212366 | A1 * | 9/2005 | Yoshiyama | H02K 29/08 |
| | | | | 310/68 B |
| 2005/0217923 | A1 * | 10/2005 | Onizuka | B62D 5/0409 |
| | | | | 180/444 |
| 2008/0211357 | A1 * | 9/2008 | Kataoka | H02K 11/215 |
| | | | | 310/68 B |
| 2009/0026860 | A1 * | 1/2009 | Ohuchi | H02K 5/08 |
| | | | | 310/71 |
| 2011/0095658 | A1 * | 4/2011 | Takeuchi | G01D 5/2458 |
| | | | | 310/68 B |
| 2012/0091830 | A1 * | 4/2012 | Kim | H02K 11/215 |
| | | | | 310/43 |
| 2013/0026888 | A1 * | 1/2013 | Migita | H02K 29/08 |
| | | | | 310/68 B |
| 2013/0140963 | A1 * | 6/2013 | Yoshidomi | H02K 11/0026 |
| | | | | 310/68 B |

FOREIGN PATENT DOCUMENTS

| | | |
|---|---|---|
| CN | 102447355 A | 5/2012 |
| JP | H03230365 A | 10/1991 |
| JP | H05095661 A | 4/1993 |

OTHER PUBLICATIONS

Stic 2800 Eic Search Report 514329 May 16, 2016.*
Stic 2800 Eic Search Report 526568 Oct. 19, 2016.*
Office Action dated Mar. 21, 2017 in Chinese Application No. 201310684440.9, along with its English translation.

* cited by examiner

MOTOR WITH MULTIPLE-POLE SENSING PLATE

CROSS-REFERENCE TO RELATED APPLICATION

This application claims the benefit under 35 U.S.C. §119 Korean Patent Application No. 10-2012-0146496, filed on Dec. 14, 2012, which is incorporated herein by reference in its entirety.

BACKGROUND

Field of the Invention

The present invention relates to a motor and a sensing magnet of the same, and more particularly, to a steering motor and a sensing magnet structure of the same.

Discussion of Related Art

A steering system is a system for ensuring steering stability of a vehicle, and assists steering by separate power.

In recent years, instead of an auxiliary steering device using oil pressure, an electronic power steering (EPS) system which has a little loss of power and is excellent in accuracy has been mainly used. The EPS includes a speed sensor, a torque angle sensor, a torque sensor, and the like.

An electronic control unit (ECU) detects running conditions through sensors included in the EPS, and drives a motor in accordance with the detected running condition. Thus, turning stability is ensured and rapid turning resiliency is provided, thereby enabling safe driving of a driver.

In the EPS system, a motor (hereinafter, referred to as "EPS motor") assists a torque for operating a handle so that a driver can perform steering operation with less power. As the EPS motor, a brushless direct current (BLDC) motor or the like can be used. The BLDC motor refers to a DC motor in which an electronic commutation mechanism is installed except a mechanical contact unit such as a brush, a commutator, or the like.

The EPS motor includes a sensing magnet for detecting an amount of rotation of the motor for the purpose of steering assistance and a sensor.

The sensing magnet is formed in a disc shape, and includes a main magnet formed on an inner side thereof and a sub magnet formed on an outer circumferential side thereof.

The main magnet includes a plurality of poles arranged in the same manner as magnets inserted into a rotor in an EPS motor, and is disposed so as to face the sensor. The sensor detects a change in magnetic flux in accordance with rotation of the main magnet, and transmits the detected signals to an ECU, thereby enabling the ECU to calculate rotation of the rotor.

The sub magnet includes a larger number of poles than those of the main magnet. The sub magnet disposes a plurality of poles so as to correspond to the single pole of the main magnet. Thus, a rotation angle may be more finely divided to be measured, and therefore driving of the EPS motor may be more smoothly performed.

A dummy track is disposed between the main magnet and the sub magnet for the purpose of minimizing the interference of the magnetic flux between the main magnet and the sub magnet and achieving sequential magnetization of the main magnet and the sub magnet.

As described above, the sensing magnet includes the main magnet and the sub magnet, and therefore an inner ring portion including the main magnet and an outer ring portion including the sub magnet are sequentially magnetized at predetermined intervals. Accordingly, two magnetization processes are performed at predetermined intervals, and therefore there is a problem that a magnetization time is increased.

In addition, the dummy track which is not used exists between the main magnet and the sub magnet, whereby costs of materials are increased.

In addition, non-uniformity of duty of frequency generator (FG) signals which are output from the sensor may occur due to occurrence of the interference of the magnetic flux between the main magnet and the sub magnet, whereby sensing accuracy is deteriorated.

BRIEF SUMMARY

The present invention is directed to a motor which may simplify a magnetization process of a sensing magnet and a sensing magnet of the motor.

According to an aspect of the present invention, there is provided a motor including: a rotating shaft; a plate that is coupled to the rotating shaft; and a sensing magnet that is coupled to the plate and includes a through hole through which the rotating shaft passes and a plurality of poles formed along an outer periphery thereof Here, the plurality of poles may include a first pole and a second pole extending from the first pole in a direction of the through hole.

According to another aspect of the present invention, there is provided a sensing magnet including: a through hole that is positioned at a center portion thereof; and a plurality of poles which are formed along an outer periphery thereof Here, the plurality of poles includes a first pole and a second pole extending from the first pole in a direction of the through hole.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION

Figure 1:
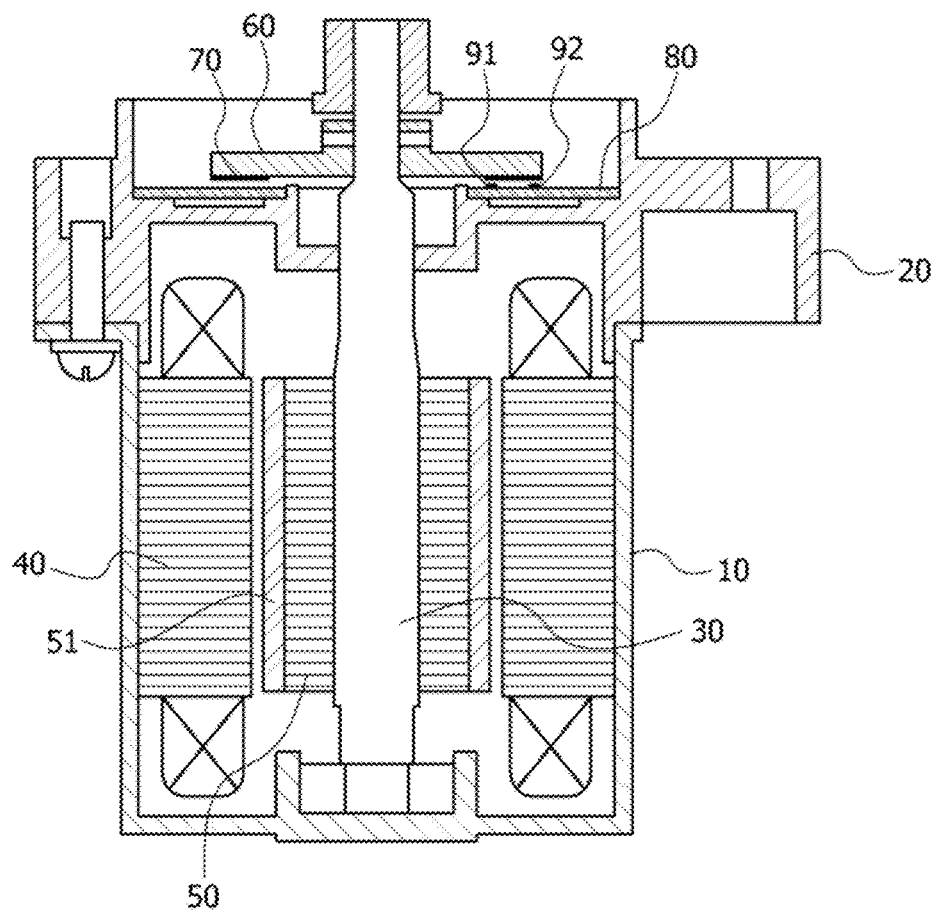
FIG. 1 is a cross-sectional view showing a motor according to an embodiment of the present invention.

Example embodiments of the present invention are disclosed herein. However, specific structural and functional details disclosed herein are merely representative for purposes of describing example embodiments of the present invention, and thus the example embodiments of the present invention may be embodied in many alternative forms and should not be construed as limited to the example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in reverse order, depending upon the functionality/acts involved.

Figure 2:
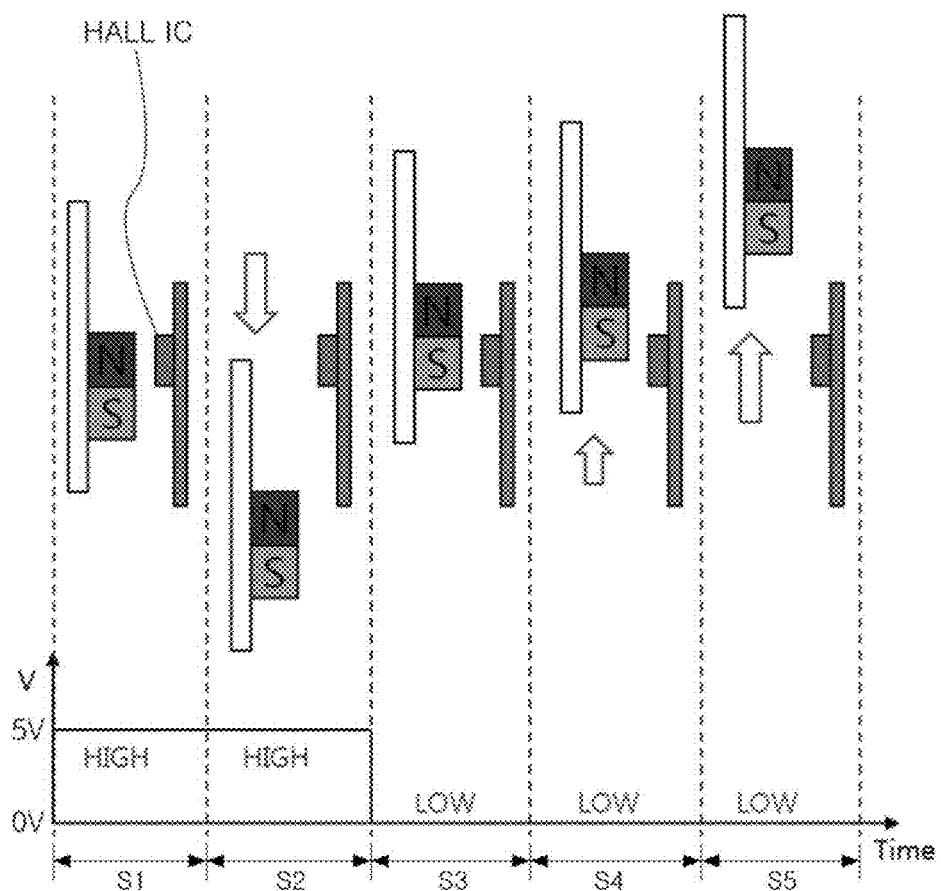
FIG. 2 is a view for describing an operation of a hall Integrated Circuit (IC) according to an embodiment of the present invention.
Figure 3:
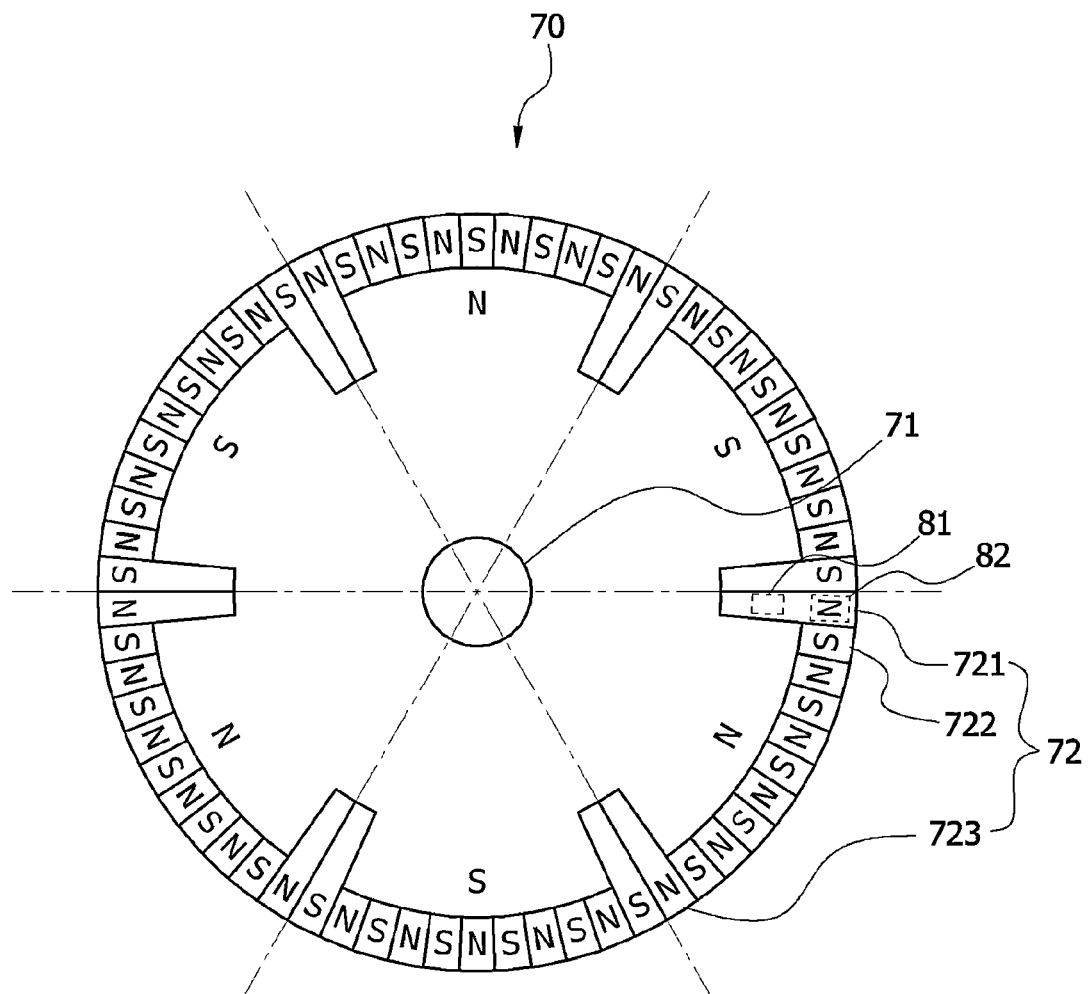
FIG. 3 is a perspective view showing a sensing magnet according to an embodiment of the present invention.

FIG. 1 is a cross-sectional view showing an electronic power steering (EPS) motor according to an embodiment of the present invention, FIG. 2 is a view for describing an operation of a hall IC according to an embodiment of the present invention, and FIG. 3 is a perspective view showing a sensing magnet according to an embodiment of the present invention.

Referring to FIG. 1, a cylindrical housing 10 with an open upper portion and a bracket 20 coupled to the upper portion of the housing 10 form the appearance of the EPS motor.

A rotating shaft 30 is rotatably supported by the housing 10 and the bracket 20.

A steering column of a vehicle is connected to an upper portion of the rotating shaft 30 to provide power for assisting steering.

A rotor 50 in which a plurality of magnets 51 are inserted is coupled to an outer circumferential surface of the rotating shaft 30. In addition, a stator 40 including a core and a coil is coupled to an inner circumferential surface of the housing 10 to provide electromagnetic force on an outer circumferential surface of the rotor 50.

The stator 40 is disposed on the inner circumferential surface of the housing 10. The stator 40 includes a stator core, a coil wound around the stator core, and an insulating paper.

The rotor 50 is coupled to the outer circumferential surface of the rotating shaft 30, and the outer circumferential surface of the rotor 50 faces the stator 40. The rotor 50 includes a rotor core and a magnet.

When a current is applied to the stator 40, the rotor 50 is rotated by electromagnetic interaction of the stator 40 and the rotor 50, and therefore the rotating shaft 30 is rotated in conjunction with the rotation of the rotor 50.

Since the rotating shaft 30 is connected to the steering column of the vehicle through a reduction gear (not shown), the steering column can be also rotated by the rotation of the rotating shaft 30. Thus, the EPS motor assists the rotation of the steering column which is rotated in conjunction with rotation of a steering wheel of a driver.

A printed circuit board (PCB) 80 is coupled to an upper surface of the bracket 20.

Sensors 91 and 92 are disposed on an upper surface of the PCB 80. The sensors 91 and 92 may be classified into a main sensor 91 and a sub sensor 92 in accordance with their positions.

The main sensor 91 may be located adjacent to the rotating shaft 30 compared to the sub sensor 92.

The main sensor 91 detects a change in polarity of the sensing magnet 70 which will be described later, or a change in magnetic flux, and outputs sensing signals used in calculating a rotation angle of the rotor 50.

The sub sensor 92 detects a change in magnetic flux of the sensing magnet 70, which will be described later, to thereby output sensing signals for a frequency generator (FG). The sensing signals for the FG output from the sub sensor 92 may be used when more finely calculating the rotation angle compared to the sensing signals output from the main sensor 91.

Each of the sensors 91 and 92 may be implemented as a hall IC.

The hall IC is a latch type, outputs first signals when an N pole approaches the hall IC, and outputs second signals different from the first signals when an S pole approaches the hall IC. In addition, the hall IC may output the first signals (or the second signals) when the N pole (or the S pole) approaches the hall IC, and continuously output the first signals (or the second signals) even though magnetic flux is not generated until the S pole (or the N pole) approaches the hall IC.

The first and second signals output from the hall IC may be signals having different magnitudes. For example, the first signal may be 5V (or 0V), and the second signal may be 0V (or 5V).

The first and second signals output from the hall IC may be signals having different magnitudes. For example, the first signal may be a signal having positive polarity (+) (or negative (−)), and the second signal may be a signal having negative polarity (−) (or positive (+)).

Referring to FIG. 2, in S1, when an N pole of the sensing magnet 70 approaches the hall IC, the hall IC outputs a sensing signal of 5V. Thereafter, the hall IC maintains 5V in S2 even though the N pole moves far away from the hall IC, and then outputs a signal of 0V by approach of an S pole of the sensing magnet 70 in S3. Thereafter, the hall IC maintains an output voltage of 0V in S4 and S5 even though the S pole of the sensing magnet 70 moves far away from the hall IC, and then changes the output voltage of 0V to 5V when the N pole approaches the hall IC.

Referring again to FIG. 1, a plate 60 is formed above the PCB 80 so as to be spaced apart from the PCB 80 by a predetermined interval, and disposed so as to face the PCB 80. The plate 60 is coupled to the rotating shaft 30 so as to be rotated together with the rotating shaft 30.

The sensing magnet 70 is disposed below the plate 60 so as to face the sensors 91 and 92 disposed on the upper surface of the PCB 80. The sensing magnet 70 is coupled to the rotating shaft 30 to be rotated together with the rotating shaft 30. As described above, each of the sensors 91 and 92 detects a change in polarity or a change in magnetic flux in accordance with rotation of the sensing magnet 70. The change in the magnetic flux in accordance with the rotation detected through the sensors 91 and 92 is used in calculating a rotation angle of the rotating shaft 30.

The EPS motor rotates the rotating shaft 30 by applying an appropriate current to the stator 40 in accordance with the calculated rotation angle of the rotating shaft 30, thereby assisting a steering torque.

Referring to FIG. 3, the sensing magnet 70 is formed in a disc shape corresponding to a shape of the plate 60.

A through hole 71 is formed in a center portion of the sensing magnet 70 so that the rotating shaft 30 passes through the through hole 71.

The sensing magnet 70 may include a plurality of N poles 721 and a plurality of S poles 722 which are alternately arranged along an outer circumference thereof. Thus, when the sensing magnet 70 is coupled to the rotating shaft 30 to be rotated, the N poles 721 and the S poles 722 alternately pass by the sensors 91 and 92. Accordingly, the sensors 91 and 92 detect a change in polarity or a change in magnetic flux to output sensing signals.

A plurality of poles 72 constituting the sensing magnet 70 are divided into a plurality of groups in accordance with a position of each of magnets 51 inserted into the rotor 50. In addition, poles 721 and 723 disposed in boundaries with other groups among the poles included in each group are formed so as to extend in a direction of the through hole 71 formed on a center side compared to the remaining poles.

All poles 72 constituting the sensing magnet 70 may be used in order for the sub sensor 92 to finely detect a change in magnetic flux in accordance with rotation of the rotor 50. For this, all poles 72 constituting the sensing magnet 70 are formed so as to cover a position 82 facing the sub sensor 92.

The poles 721 and 723 extending in the direction of the through hole 71 among the poles constituting the sensing magnet 70 may also be used in order for the main sensor 91 to detect a change in magnetic flux in accordance with rotation of the rotor 50. For this, the poles 721 and 723 extend so as to cover up to a position 81 facing the main sensor 91. That is, the poles 721 and 723 disposed in the boundary of each group serve as a main magnet as well as a general sub magnet.

Thus, polarity of each of the poles 721 and 723 which extend in the direction of the through hole 71 in each group may be determined in accordance with a position of each magnet inserted into the rotor 50. That is, each group may be formed in such a manner that poles having the same polarity as that of the magnet of the rotor 50 corresponding to each group are arranged in the boundary portion. For example, in the case of the group corresponding to the magnet of the N pole inserted into the rotor 50, the N poles and the S poles are alternately arranged so that the N poles are arranged in the boundary portion of the group.

As described above, since the main sensor 91 implemented as the hall IC is operated as a latch, when the N pole (or S pole) is detected in the boundary of each group, sensing signals corresponding to the N pole are continuously output before detecting the S pole (or N pole) even though a magnetic flux is not generated. Thus, the sensing magnet 70 may extend poles located in a boundary portion where a main pole is changed, to a position facing the main sensor 91 and use the extending poles as the main magnet, without magnetizing a separate main magnet.

As described above, according to the embodiments of the present invention, some poles among poles serving as the sub magnet may extend to be used as the main magnet, without magnetizing a separate main magnet. Thus, a magnet requirement which is used in forming the main magnet and the dummy track positioned between the main magnet and the sub magnet may be reduced, thereby reducing costs of materials.

In addition, without magnetizing the inner ring portion corresponding to the main magnet and the outer ring portion corresponding to the sub magnet twice when magnetizing the sensing magnet, the number of times of performing a magnetization process may be reduced to one, thereby simplifying the magnetization process.

In addition, FG distortion occurring due to the main magnet may be inhibited by removing the main magnet.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A motor comprising:
   a rotating shaft;
   a plate coupled to the rotating shaft; and a sensing magnet having a shape of a circle and coupled to the plate including a through hole at a center of the sensing magnet through which the rotating shaft passes, the sensing magnet having a plurality of poles;
   wherein the plurality of poles includes a first pole and a second pole, outer ends of the first and second poles forming along an outer circumference of the sensing magnet and the first and second poles extending from the outer circumference in a radial direction of the sensing magnet toward the through hole, the second pole radially extending with a radial length of extension greater than a radial length of extension of the first pole such that an inner end of the second pole is more proximate to the center of the sensing magnet than an inner end of the first pole, wherein the second pole comprises a single pole unit of S polarity and a same number of a single pole unit of N polarity;
   wherein a rotor is coupled to the rotating shaft and includes a plurality of magnets, a printed circuit board is disposed to face the plate, and first and second sensors are disposed in mutually different positions at an upper surface of the printed circuit board and detect a change in magnetic flux of the sensing magnet in accordance with rotations of the rotating shaft;

wherein the first and second poles are disposed in a position facing the first sensor, and the second pole extends to a position facing the second sensor; and wherein the plurality of poles is divided into a plurality of groups, and the second pole is disposed at a boundary of each of the plurality of groups.

* * * * *